United States Patent
Kim et al.

(10) Patent No.: US 10,911,378 B2
(45) Date of Patent: Feb. 2, 2021

(54) SYSTEM AND METHOD FOR PROVIDING CONVERSATIONAL CONTENTS

(71) Applicant: SAMSUNG ELECTRONICS CO., LTD., Suwon-si (KR)

(72) Inventors: Sungjin Kim, Suwon-si (KR); Yongsuk Kwon, Suwon-si (KR); Myeongcheol Kim, Suwon-si (KR); Yoonsung Nam, Suwon-si (KR); Hyongjin Ban, Suwon-si (KR); Sangsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/270,954

(22) Filed: Feb. 8, 2019

(65) Prior Publication Data
US 2019/0253368 A1   Aug. 15, 2019

(30) Foreign Application Priority Data

Feb. 9, 2018 (KR) .......................... 10-2018-0016210

(51) Int. Cl.
*G06F 15/16* (2006.01)
*H04L 12/58* (2006.01)

(52) U.S. Cl.
CPC .............. *H04L 51/02* (2013.01); *H04L 51/06* (2013.01)

(58) Field of Classification Search
CPC ................................ H04L 51/02; H04L 51/06
See application file for complete search history.

(56) References Cited

U.S. PATENT DOCUMENTS

| | | | |
|---|---|---|---|
| 7,698,462 B2 | 4/2010 | McQuillen et al. | |
| 8,171,159 B2 | 5/2012 | McQuillen et al. | |
| 8,386,638 B2 | 2/2013 | McQuillen et al. | |
| 9,678,950 B2 | 6/2017 | Pattan et al. | |
| 10,284,640 B2 | 5/2019 | Jalwadi et al. | |
| 10,326,789 B1* | 6/2019 | Vines | H04L 67/2814 |
| 10,439,979 B2* | 10/2019 | Zucker | H04L 51/02 |
| 2009/0106377 A1 | 4/2009 | McQuillen et al. | |
| 2010/0198932 A1 | 8/2010 | McQuillen et al. | |
| 2012/0221658 A1 | 8/2012 | McQuillen et al. | |
| 2013/0066624 A1 | 3/2013 | Pattan et al. | |
| 2013/0159444 A1 | 6/2013 | McQuillen et al. | |

(Continued)

OTHER PUBLICATIONS

International Search Report dated May 22, 2019 in counterpart International Patent Application No. PCT/KR2019/001576.

*Primary Examiner* — Philip B Tran
(74) *Attorney, Agent, or Firm* — Nixon & Vanderhye P.C.

(57) ABSTRACT

An electronic device may be configured to receive a message for a second external electronic device, from a first external electronic device through a first network associated with the first external electronic device among a plurality of rich communication suite (RCS) networks using a communication circuit, to determine whether to transmit the message based on a profile of the second external electronic device including at least one throttling metric for the first network among the plurality of RCS networks stored in a memory and a network state of the first network, and to convert the message based on a protocol of a second network and to transmit the converted message to the second external electronic device through the second network based on determining to transmit the message.

17 Claims, 11 Drawing Sheets

(56) References Cited

U.S. PATENT DOCUMENTS

| | | | |
|---|---|---|---|
| 2014/0122619 A1* | 5/2014 | Duan | G06F 40/20 709/206 |
| 2014/0372557 A1 | 12/2014 | Buckley et al. | |
| 2014/0378105 A1* | 12/2014 | Suryavanshi | H04L 65/1016 455/414.1 |
| 2016/0094492 A1* | 3/2016 | Li | H04L 51/02 709/206 |
| 2016/0286027 A1 | 9/2016 | Lee et al. | |
| 2017/0063977 A1 | 3/2017 | Jalwadi et al. | |
| 2017/0134322 A1 | 5/2017 | McQuillen et al. | |
| 2017/0180276 A1* | 6/2017 | Gershony | H04L 51/02 |
| 2017/0366478 A1* | 12/2017 | Mohammed | H04L 51/04 |
| 2018/0302349 A1 | 10/2018 | Ban et al. | |
| 2019/0182382 A1* | 6/2019 | Mazza | G10L 15/1815 |

* cited by examiner

SYSTEM AND METHOD FOR PROVIDING CONVERSATIONAL CONTENTS

CROSS-REFERENCE TO RELATED APPLICATION

This application is based on and claims priority under 35 U.S.C. § 119 to Korean Patent Application No. 10-2018-0016210, filed on Feb. 9, 2018, in the Korean Intellectual Property Office, the disclosure of which is incorporated by reference herein its entirety.

BACKGROUND

1. Field

The present disclosure relates to a system, an electronic device, a server, and a method for providing conversational contents and/or dialog based interactive contents.

2. Description of Related Art

With the distribution of various portable electronic devices such as smart phones, users may easily access Internet through a wireless network. For example, the users may search for desired information by transmitting search words to search engines and then receiving found results from the search engines. In this case, a user may enter an appropriate search word to search for desired information. For the purpose of reducing the difficulty of selecting appropriate search words, a service of providing conversational contents or dialog based interactive contents is being tried. For example, the service of providing conversational contents or dialog based interactive contents may provide contents corresponding to a user's request, in the conversational format based on the understanding of natural language.

For example, conversational contents based on rich communication suite (RCS) may be provided. The RCS network may be compliant with the protocol of the international standard (e.g., the global system for mobile communication association (GSMA) standard) of the next generation unified messaging service. Since each network operator (e.g., a mobile network operator (MNO)) is capable of operating a separate RCS network, the providers of RCS-based conversational contents may need to build a platform for providing separate conversational contents depending on MNOs, respectively.

The above information is presented as background information only to assist with an understanding of the present disclosure. No determination has been made, and no assertion is made, as to whether any of the above might be applicable as prior art with regard to the present disclosure.

SUMMARY

According to various embodiments of the present disclosure, a unified conversational contents providing service may be implemented for various RCS networks through a platform for providing conversational contents. For example, a platform structure capable of providing conversational contents for a plurality of MNOs through a single conversational contents providing platform may be provided.

In accordance with an aspect of the present disclosure, an electronic device may include a communication circuit, a processor operatively connected to the communication circuit, and a memory operatively connected to the processor. The memory may store instructions that, when executed, cause the processor to control the electronic device to receive a message for a second external electronic device, from a first external electronic device through a first network associated with the first external electronic device from among a plurality of rich communication suite (RCS) networks using the communication circuit, to determine whether to transmit the message based on a profile of the second external electronic device including at least one throttling metric for the first network among the plurality of RCS networks stored in the memory and a network state of the first network, and, based on it being determined that the message is transmitted, to convert the message based on a protocol of a second network and to transmit the converted message to the second external electronic device through the second network.

In accordance with another aspect of the present disclosure, an electronic device may include a communication circuit, a processor operatively connected to the communication circuit, and a memory operatively connected to the processor. The memory may store instructions that, when executed, cause the processor to control the electronic device to receive a message for a second external electronic device from a first external electronic device through a first network using the communication circuit, to verify a second network associated with the second external electronic device from among a plurality of RCS networks based on user information stored in the memory, to convert the message based on a protocol of the second network, and to transmit the converted message to the second external electronic device through the second network.

In accordance with another aspect of the present disclosure, an electronic device may include a communication circuit, a processor operatively connected to the communication circuit, and a memory operatively connected to the processor, wherein the memory may include instructions defining a plurality of modules comprising a bot registry module comprising program elements executable by the processor and configured to manage chatbot information of at least one chatbot, a user registry module comprising program elements executable by the processor and configured to manage user information, a throttling system module comprising program elements executable by the processor and configured to control throttling associated with the at least one chatbot, a bot service module comprising program elements executable by the processor and configured to control a message between the at least one chatbot and the electronic device, and a plurality of bot agent modules comprising program elements executable by the processor and configured to convert a message generated based on a first protocol depending on a second protocol or to convert a message generated depending on the second protocol depending on the first protocol and configured to control message transmission and reception between the electronic device and user equipment. The plurality of bot agent modules may include a first bot agent module and a second bot agent module, and a first network associated with the first bot agent module and a second network associated with the second bot agent module may be associated with network operators different from each other.

According to various embodiments, the unified management for a plurality of MNOs may be provided through a conversational contents providing platform.

According to various embodiments, the stable service may be provided through throttling control based on an RCS network.

According to various embodiments, a throttling state of a chatbot associated with the RCS network may be provided to user equipment (UE).

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Below, various example embodiments of the present disclosure may be described with reference to accompanying drawings. The embodiments and terms used with regard to the embodiments are not intended to limit the technology described herein to specific embodiments, and should be understood to include various modifications, equivalents, and/or alternatives of the illustrated example embodiments.

Figure 1:
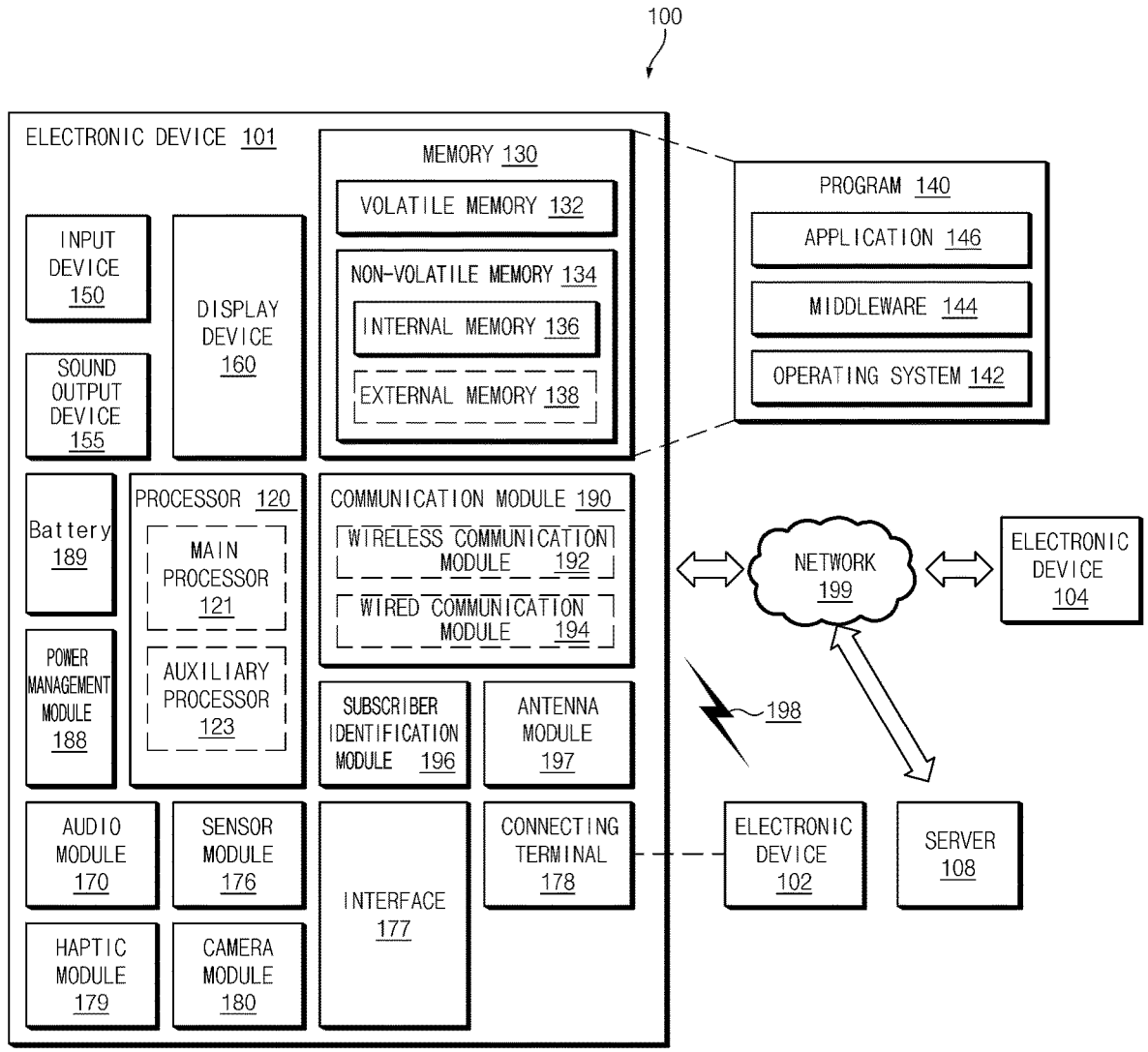
FIG. 1 is a block diagram illustrating an example electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
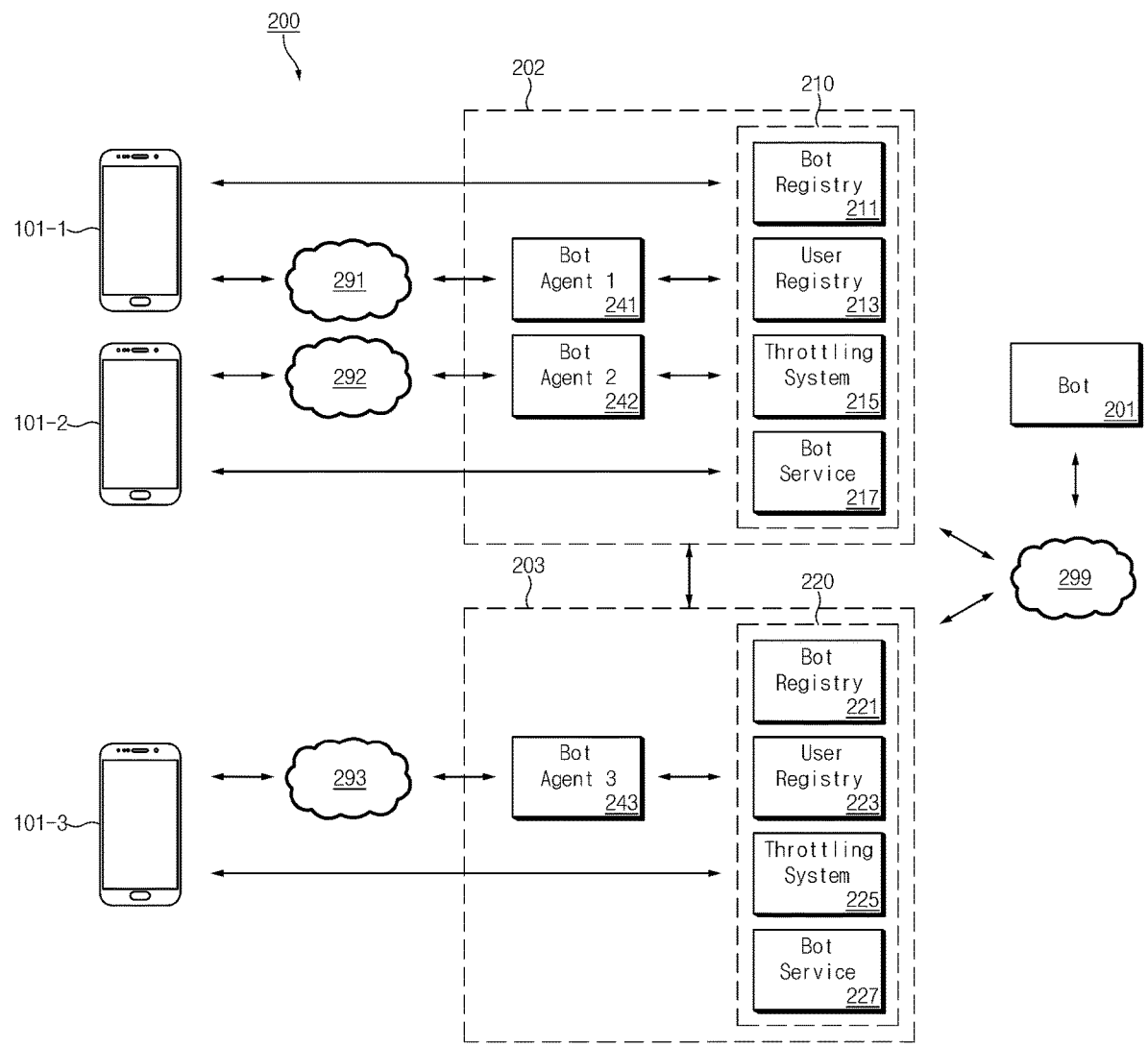
FIG. 2 is a block diagram illustrating an example configuration of a conversational contents providing system, according to various embodiments.

FIG. 2 is a block diagram illustrating an example configuration of a conversational contents providing system 200, according to various embodiments.

According to various embodiments, the conversational contents providing system 200 may include pieces of user equipment (UE) 101-1, 101-2, and 101-3, platform servers 202 and 203, and a bot (e.g., including executable program elements) 201.

According to various embodiments, the pieces of UE (e.g., 101-1, 101-2, and 101-3) may correspond to the electronic device 101 (e.g., without limitation, a smart phone, a computer device, a tablet PC, a laptop PC, a wearable device, a desktop PC, or the like) of FIG. 1. Referring to FIG. 2, for example, the first UE 101-1 may be associated with a first RCS network 291; the second UE 101-2 may be associated with a second RCS network 292; and the third UE 101-3 may be associated with a third RCS network 293. According to an embodiment, at least one of a region (e.g., country) or a network operator (e.g., MNO) of each of the first RCS network 291, the second RCS network 292, and the third RCS network 293 may differ from each other. For example, the first RCS network 291 and the second RCS network 292 may be positioned at a first region, and may be operated by different MNOs. For example, the third RCS network 293 may be located in a second region different from the first region. Hereinafter, the electronic device 101 may be referred to as "the first UE 101-1, the second UE 101-2, or the third UE 101-3".

According to various embodiments, the electronic device 101 and the platform servers 202 and 203 may communicate with each other via the RCS networks 291, 292, and 293 and/or a data network (e.g., a data network 299). According to an embodiment, the electronic device 101 may access the platform servers 202 and 203 by accessing a specified web page using a web browser application. According to an embodiment, the electronic device 101 may access the platform servers 202 and 203, using, for example, and without limitation, a dedicated application.

According to various embodiments, the electronic device 101 may search for at least one conversational contents provider through the platform servers 202 and 203. According to an embodiment, the electronic device 101 may search for an at least one contents provider, using an application (e.g., a messenger application) based on the RCS network. For example, the application based on the RCS network may search for at least one conversational contents provider through the platform servers 202 and 203 based on hypertext transfer protocol (HTTP) or HTTP secure (HTTPS). For example, the search for a conversational contents provider (CP) may include searching for a contents provider server and/or a chatbot (e.g., the bot 201). According to an embodiment, the electronic device 101 may be configured to display a search result on a display (e.g., the display device 160 of FIG. 1). For example, the search result may include state information (e.g., throttling information) associated with each conversational contents provider. According to an embodiment, the electronic device 101 may subscribe to the conversational contents provider found based on a user input. For example, the electronic device 101 may be configured to display the list of subscribed conversational contents providers on a display.

According to various embodiments, the electronic device 101 may transmit messages to the platform servers 202 and 203 or may receive messages from the platform servers 202 and 203, via the RCS networks 291, 292, and 293. For example, the first UE 101-1 may transmit a message to the first platform server 202 or may receive a message from the first platform server 202, via the first RCS network 291.

According to various embodiments, the RCS networks 291, 292, and 293 may be configured to perform data communication based on a specified protocol (e.g., RCS protocol). According to an embodiment, the RCS networks 291, 292, and 293 may specify subscribers (e.g., the electronic device 101, and the bot 201) based on a phone number (e.g., mobile station international subscriber directory number (MSISDN). Unlike the over the top (OTT)-based messenger application, for example, since a user may be specified based on the phone number, the user of the electronic device 101 may use the conversational contents through the associated RCS networks 291, 292, and 293 without a separate sign-up procedure or login procedure.

According to various embodiments, the bot 201 may include a chatbot for providing conversational contents. For example, the bot 201 may be located in a contents provider server (not illustrated) of the conversational contents. The one bot 201 is shown in FIG. 2, but a plurality of bots may be associated with one platform server 202 or 203. According to an embodiment, the bot 201 may include various executable program elements, such as, for example, and without limitation, a natural language understanding (NLU) module and/or a natural language processing (NLP) module, or the like, that supports machine learning or artificial intelligence. Hereinafter, the term "bot" may be referred to as a chatting bot, a contents provider server, a bot module, or a bot program.

According to various embodiments, the platform servers 202 and 203 may transmit messages between the electronic device 101 and the bot 201. According to an embodiment, the first platform server 202 may receive a message associated with the bot 201 from the first UE 101-1 via the first RCS network 291 and may transmit the message to the bot 201 via the data network 299. According to an embodiment, the first platform server 202 may receive the message associated with the first UE 101-1 from the bot 201 and may transmit the message to the first UE 101-1 via the first RCS network 291. An embodiment is illustrated, by way of example, in FIG. 2 as the first platform server 202 and the bot 201 communicate with each other through the data network 299. However, the first platform server 202 and the bot 201 may communicate with each other using a separate data communication. For example, the first platform server 202 and the bot 201 may communicate with each other via a wired connection. For example, the bot 201 may be implemented inside the first platform server 202.

According to various embodiments, the RCS networks 291, 292, and 293 and the data network 299 may be networks based on protocols different from each other. For example, the RCS networks 291, 292, and 293 may be configured to perform communication based, for example, and without limitation, on a session initiation protocol (SIP), message session relay protocol (MSRP), or the like, and the data network 299 may be configured to perform communication based, for example, and without limitation, on HTTP, HTTPS, or the like.

According to various embodiments, the first platform server 202 and the second platform server 203 may be located at physical locations different from each other. For example, the first platform server 202 and the second platform server 203 may be located at countries different from each other. For example, the first platform server 202 may be located in the first region, and the second platform server 203 may be located in the second region. Hereinafter, the operation of the platform server will be described focusing on the first platform server 202. The operations of the first platform server 202 to be described below may be performed in the same or similar manner by the second platform server 203. The description about the configurations of the second platform server 203 may be referenced by a description about the configuration of the first platform server 202 having the same name.

According to various embodiments, the first platform server 202 may include at least one bot agent (e.g., a first bot agent 241 and a second bot agent 242) and a common area 210. An embodiment is illustrated, by way of non-limiting example, in FIG. 2 as the first platform server 202 includes the first bot agent 241 and the second bot agent 242. However, the number of bot agents is not limited thereto.

According to various embodiments, the first bot agent 241 and the second bot agent 242 may be associated with different MNOs. For example, the first bot agent 241 may be associated with the first RCS network 291, and the second bot agent 242 may be associated with the second RCS network 292. The description associated with the first bot agent 241 to be described below may be applied to the second bot agent 242 and a third bot agent 243.

According to various embodiments, the first bot agent 241 may be the instance of the bot 201 and/or the contact point of a user. According to an embodiment, at least one bot agent (e.g., the first and second bot agents 241 and 242) may operate in conjunction with a bot service 217. For example, the first bot agent 241 may communicate with the bot service 217. According to an embodiment, the first bot agent 241 may transmit and/or distribute a message from the associated bot (e.g., the bot 201) to at least one UE (e.g., the first UE 101-1) via the associated RCS network (e.g., the first RCS network 291). According to an embodiment, the first bot agent 241 may collect a message from the first UE 101-1 belonging to the first RCS network 291 or may transmit the message to the bot service 217. According to an embodiment, one bot agent operates in conjunction with one or more bot services.

According to various embodiments, the first bot agent 241 may transmit the message, which is transmitted or routed from a throttling system 215 or the bot service 217, to the target UE (e.g., the first UE 101-1) of the message via the associated RCS network (e.g., the first RCS network 291). According to an embodiment, the first bot agent 241 may convert a message based on the first protocol (e.g., SIP or MSRP) of the RCS network (e.g., the first RCS network 291) into a message based on the second protocol (e.g., HTTP or HTTPS) of the data network 299. According to an embodiment, the first bot agent 241 may convert a message based on the second protocol to a message based on the first protocol. According to an embodiment, the first bot agent 241 may receive the first message based on the first protocol, from the first UE 101-1 via the first RCS network 291; the first bot agent 241 may convert the first message into a second message based on the second protocol and may transmit the second message to the common area 210 (e.g., the bot service 217). According to an embodiment, the first bot agent 241 may receive a third message based on the second protocol, which is received from the common area 210 (e.g., the bot service 217), and may convert the third message to a fourth message based on the first protocol and may transmit the fourth message to the first UE 101-1 through the first RCS network 291. According to an embodiment, the message conversion described above may be performed in the common area 210 (e.g., the bot service 217).

According to various embodiments, the first bot agent 241 may transmit a message based on the state (e.g., throttling state) of the associated bot (e.g., the bot 201). According to an embodiment, when a message is received from the first UE 101-1, the first bot agent 241 may verify the network state of the bot 201 through the throttling system 215. For example, when it is indicated that the message transmission is possible, by the throttling system 215, the first bot agent 241 may transmit the message to the common area 210 (e.g., the bot service 217). For example, when it is indicated that the message transmission is impossible, by the throttling system 215, the first bot agent 241 may perform a retransmission of a message at a specified period, may transmit an error message to the first UE 101-1, or may schedule the retransmission of the message. For example, when it is indicated that the message transmission is impossible, by the throttling system 215, the first bot agent 241 may perform delay transmission of the message.

According to various embodiments, the common area 210 may include configurations for performing common functions with respect to the bot agents (e.g., the first bot agent 241 and the second bot agent 242) of the first platform server 202. The contents provider may perform integrated management for each MNO, through the common area 210. According to an embodiment, the common area 210 may include, for example, and without limitation, a bot registry 211, a user registry 213, the throttling system 215, and the bot service 217.

According to various embodiments, the bot registry 211 may manage the bot information (e.g., the identifier of the chatbot) stored in the bot database (not shown). For example, the identifier of the chatbot may include MSISDN and/or uniform resource indicator (URI) (e.g., SIP URI) of a chatbot. According to an embodiment, the bot registry 211 may read or write the bot information under control of the bot service 217.

According to various embodiments, the user registry 213 may manage user/subscriber information stored in a user database (not illustrated). For example, the user/subscriber information may include at least one of a user ID, a chat ID, or identification information (e.g., MSISDN) of UE. According to an embodiment, the user registry 213 may read or write the user/subscriber information under control of the bot service 217. According to an embodiment, the user registry 213 and the bot registry 211 may be implemented as an integrated module.

According to various embodiments, the throttling system 215 may control traffic based on the network state of the bot 201. According to an embodiment, the throttling system 215 may determine whether to transmit a message based on the profile and traffic associated with each RCS network. For example, when a traffic verification request is received from the first bot agent 241, the throttling system 215 may determine whether to transmit a message based on the first profile for the first RCS network 291 and the traffic of the bot 201 for the first RCS network 291. For example, when a traffic verification request is received from the second bot agent 242, the throttling system 215 may determine whether to transmit a message based on the second profile for the second RCS network 292 and the traffic of the bot 201 for the second RCS network 292. For example, when the traffic exceeds a specified metric, the throttling system 215 may transmit an error message to the associated bot agent. For example, when the traffic is within the specified metric, the throttling system 215 may transmit information indicating the message transmission to the associated bot agent.

According to various embodiments, the bot service 217 may operate as an uptown mediator module of the conversational contents providing system 200. According to an embodiment, the bot service 217 may route a message from the chatbot 201, to a bot agent (e.g., the first bot agent 241 or the second bot agent 242).

According to an embodiment, the bot service 217 may convert the destination identifier and/or the source identifier of the messages processed in the bot service 217, into each other. For example, the bot service 217 may convert the destination of the first message generated by the first UE 101-1 from MSISDN to URI and/or may convert the source of the first message from the MSISDN to a unique identifier. For example, the bot service 217 may convert the source of the second message generated from the chatbot 201 from URI to MSISDN and/or may convert the destination of the second message from the unique identifier to MSISDN.

According to an embodiment, the bot service 217 may communicate with the bot registry 211 to retrieve the URI (e.g., callback-URL (uniform resource locator)) of the chatbot 201 or the MSISDN corresponding to URI. According to an embodiment, the bot service 217 may communicate with the user registry 213 to retrieve the unique identifier (e.g., UserID, or ChatID) of each of the pieces of UE 101-1 and 101-2 or the MSISDN corresponding to the unique identifier.

According to various embodiments, the bot service 217 may listen to the create notification from the newly published chatbot and may communicate with the bot registry 211 to register the newly published chatbot.

According to an embodiment, the above-described configurations of the first platform server 202 may, for example, be software modules; after the above-described configurations of the first platform server 202 are loaded on a memory, the function assigned to each configuration may be executed by a computing resource of the processor. For example, the operations of the first platform server 202 and configurations thereof described above may be understood as operations performed by a processor executing the various software modules. According to an embodiment, the configurations of the first platform server 202 described above may be implemented by a plurality of servers physically distinguished from each other. For example, at least one of the configurations of the first platform server 202 may be implemented in at least another server communicating with the first platform server 202.

According to various embodiments, the first platform server 202 and the second platform server 203 may be platforms for providing chatbot services for different physical regions, respectively. According to an embodiment, the first platform server 202 and the second platform server 203 may transmit and receive data via the data network 299. According to an embodiment, the first platform server 202 and the second platform server 203 may exchange data traffic through a virtual private network (VPN) or a direct link. According to an embodiment, the first platform server 202 and the second platform server 203 may synchronize at least a portion of the user database associated with the user registry 213 and the user database associated with a user registry 223, periodically or based on a request. According to an embodiment, the first platform server 202 and the second platform server 203 may synchronize at least a portion of the bot database associated with the bot registry 211 and the bot database associated with a bot registry 221, periodically or based on a request.

According to various embodiments, the first platform server 202 may include the bot registry 211 configured to manage chatbot information of at least one chatbot, the user registry 213 configured to manage user information, the throttling system 215 configured to control throttling associated with at least one chatbot, and the plurality of bot agents 241 and 242. For example, the plurality of bot agents 241 and 242 may be associated with RCS networks associated with different network operators. According to an embodiment, the plurality of bot agents 241 and 242 may convert the message generated based on the first protocol (e.g., SIP or MSRP), depending on the second protocol (e.g., HTTP or HTTPS) or may convert the message generated based on the second protocol depending on the first protocol.

According to an embodiment, the throttling system 215 (or 225) may be configured to control traffic for the chatbot 201 based on a profile set for the chatbot 201 of at least one chatbot. For example, the profile may include at least one throttling metric set for each of the first RCS network 291 and the second RCS network 292.

Figure 3A:
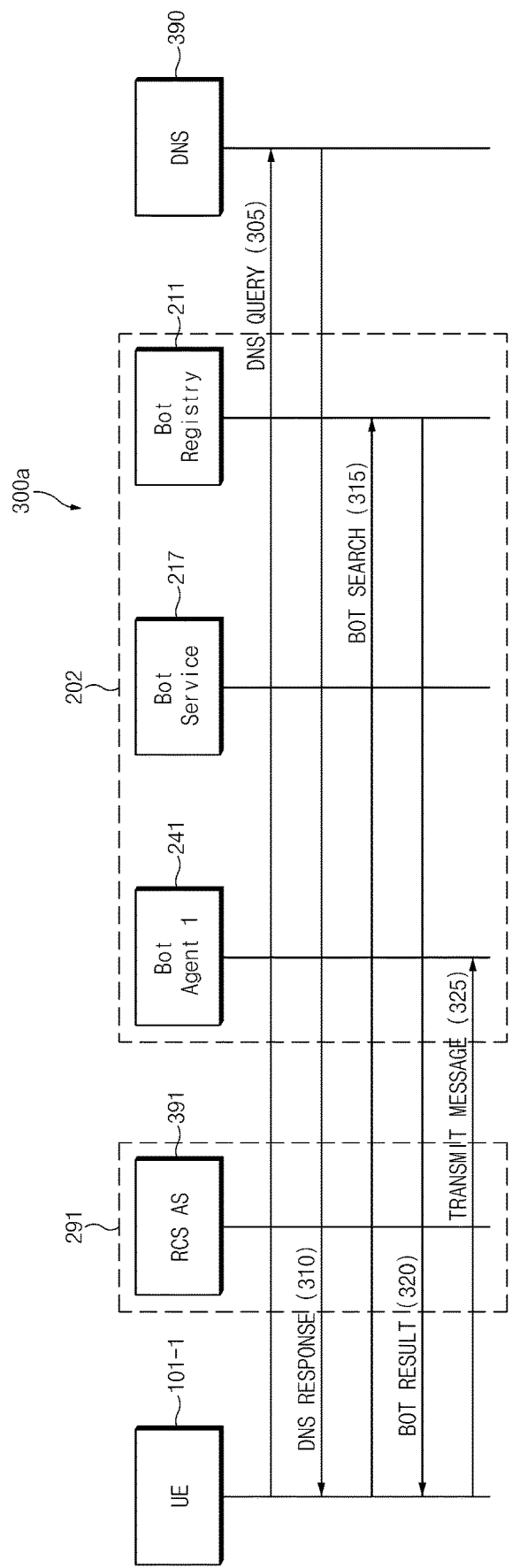
FIGS. 3A, 3B, and 3C are flowcharts illustrating an example message transmitting method of UE, according to various embodiments of the present disclosure.
Figure 3B:
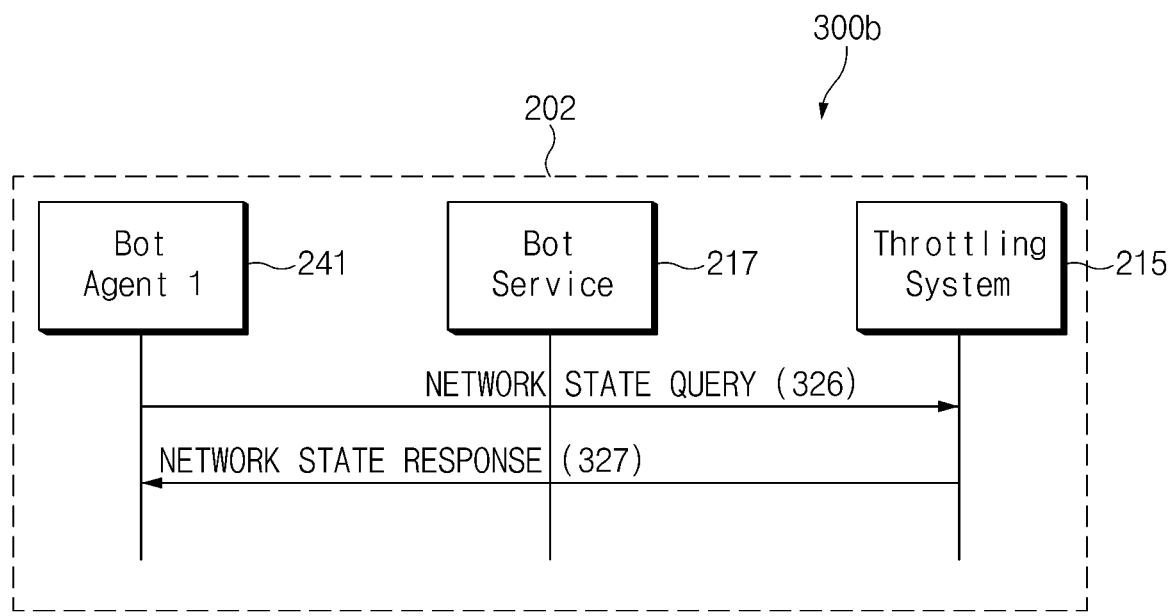
Figure 3C:
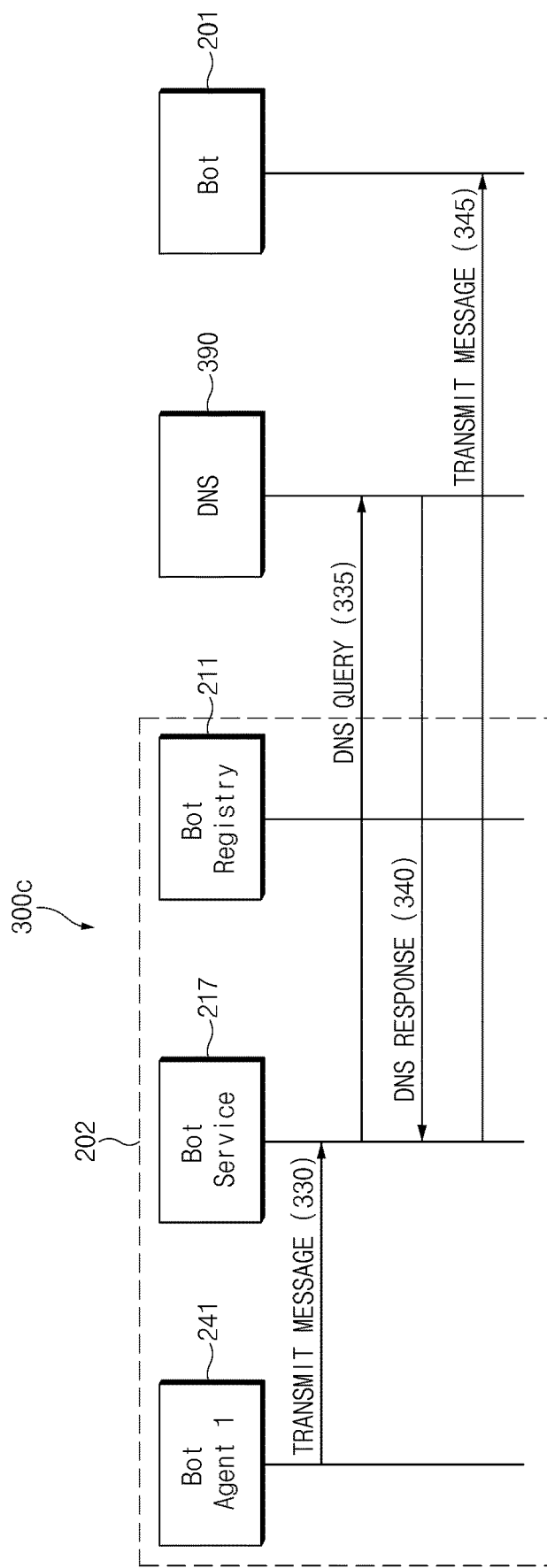

FIGS. 3A, 3B, and 3C are flowcharts illustrating an example message transmitting method of UE, according to various embodiments of the present disclosure.

Referring to flowchart 300a of FIG. 3A, according to various example embodiments, in operation 305, the first UE 101-1 may transmit a DNS query to a domain name system (DNS) 390. For example, the DNS 390 may be referred to as a domain server corresponding to the domain (e.g., botplatform.maaprcs.com) of the conversational platform. According to an embodiment, the first UE 101-1 may transmit a DNS query using, for example, a specified web page or a dedicated application. According to an embodiment, the first UE 101-1 may transmit a DNS query over a data network (e.g., the data network 299 of FIG. 2).

According to various embodiments, in operation 310, the first UE 101-1 may receive a DNS response from the DNS 390. For example, the DNS response may include the address (e.g., IP address) of the bot registry 211 of the region to which the first UE 101-1 belongs.

According to various embodiments, in operation 315, the first UE 101-1 may transmit a bot search request to the received address of the bot registry 211. According to an embodiment, the bot search request may include information about the content type for the bot search.

According to various embodiments, the bot registry 211 may manage the information of the bot 201 for a plurality of network operators (e.g., MNOs). For example, for the purpose of receiving messages from a plurality of network users, the bot registry 211 may manage information about a number or an identifier capable of receiving messages from a plurality of MNO operators. For example, the bot registry 211 may store information of a number or an identifier of a plurality of MNO operators associated with the bot 201 in a bot database. According to an embodiment, MSISDN-based message and/or SIP URI-based (or MSRP-based) messages may be supported for the network of one provider. For example, the bot registry 211 may manage and store a matching table including a unique ID set for a conversational contents providing system (e.g., the conversational contents providing system 200 of FIG. 2) or the first platform server 202 and bot contact information allocated to each MNO associated with a unique ID, with respect to the bot 201. For example, the matching table according to an example may be as shown in Table 1 below.

TABLE 1

| Bot ID | MNO (Supported ID Type) | ID for each MNO |
| --- | --- | --- |
| aaa@bbb.com | MNO 1 TEL URI | +8210-xxxx-xxxx |
|  | MNO 2 SIP URI | aaa@mno2.com |
|  | MNO 3 TEL URI | +1451-xxx-xxxx |

In Table 1 above, for example, "bbb.com" may indicate the domain address (e.g., maaprcs.com) of the DNS 390. For example, "mno2.com" may indicate the domain address of MNO 2.

According to various embodiments, in operation 320, the bot registry 211 may transmit the bot result to the first UE 101-1. According to an embodiment, the bot registry 211 may transmit a bot result including the bot list found based on the contents type information included in the bot search request. According to an embodiment, the bot result may include, for example, at least one of a name of the found bot, publisher information of a bot, MSISDN of a bot, ID of a bot, URL information of an icon of a bot, bot network state information (e.g., throttling information), bot simple information, or bot detailed information. According to an embodiment, the bot registry 211 may include the identifier of the bot 201 corresponding to the MNO associated with the first UE 101-1 in the bot result.

According to an embodiment, the bot network state information may include, for example, at least one of the response speed, the amount of traffic, and/or throttling information of the found bot. For example, the bot registry 211 may retrieve bot network state information from the throttling system 215. According to an embodiment, the bot registry 211 may update the bot network state information, periodically or based on a request.

According to an embodiment, the first UE 101-1 may display a list of bots found based on the received bot results, on a display (e.g., the display device 160 of FIG. 1). For example, the list of bots may include at least one of the name of the bot, the icon of the bot, the description of the bot, or the network state of the bot. For example, the first UE 101-1 may display a list of bots arranged based on the network state of the bot, on the display. For example, the network state of the bot may indicate the load state of the bot. For example, a user may select a bot with a low load among bots of the same type or may select a bot with a high load (e.g., popular) among bots of the same type.

According to an embodiment, access to a bot of a load state where the specified range is exceeded may be limited. For example, the bot registry 211 may exclude any bot, the load state of which exceeds the specified range, from the search result. For example, the first UE 101-1 may exclude a bot, the load state of which exceeds the specified range, from the search result.

According to an embodiment, the first UE 101-1 may display an image (e.g., icon) indicating the network state of a bot (e.g., the load state of the bot) together with the list of bots. For example, when the load state of the bot exceeds the specified range, the first UE 101-1 may display a first image indicating the load state together with the associated bot information (e.g., a name or an identifier). For example, when the load state of the bot is not greater than the specified range, the first UE 101-1 may display a second image indicating the normal state together with the associated bot information. The network state of the bot is described using two steps. However, according to an embodiment, the network state of the bot may be divided into a plurality of network states. For example, a plurality of images may be set to correspond to each of the plurality of network states.

According to various embodiments, in operation 325, the first UE 101-1 may transmit a message to the first bot agent 241. For example, the first UE 101-1 may transmit a message based at least on the user input for one bot in the bot list. For example, the first UE 101-1 may transmit a message to the bot agent 241 through the first RCS network 291, using a bot identifier (e.g., at least one of phone number (e.g., MSISDN) or SIP URI) allocated to the MNO of the first RCS network 291. For example, the first UE 101-1 may transmit a message to the first platform server 202 via the RCS application server (AS) 391 of the first RCS network 291. For example, in operation 325, the message may be a message based on SIP or MSRP. According to an embodiment, the message may include at least one of the message entered by the user of the first UE 101-1, the bot ID, the chat ID, and the contact information of the message.

In the embodiment of FIG. 3A, when the first UE 101-1 already has information about the bot 201, operations 305, 310, 315 and 320 may be skipped. For example, the first UE 101-1 may perform an operation 325 on the selected bot 201 based on a selection input for a stored bot list (e.g., a list of subscribed bots).

Referring to flowchart 300b of FIG. 3B, according to various embodiments, when a message is received from the first UE 101-1, the first bot agent 241 may query the throttling system 215 for a network state.

According to various embodiments, in operation 326, the first bot agent 241 may transmit a network state query to the throttling system 215 for the purpose of querying about whether to transmit a message transmitted from the first UE 101-1 to the bot 201. According to an embodiment, the first bot agent 241 may transmit a network state query of the RCS network (e.g., the first RCS network 291) associated with the first UE 101-1. For example, the network state may include the throttling state of the first RCS network 291 with respect to the bot 201.

According to various embodiments, in operation 327, the throttling system 215 may transmit a network state response to the first bot agent 241 in response to the query. According to an embodiment, the throttling system 215 may determine whether to transmit a message based on the throttling state of the first network of the bot 201. The throttling system 215 may include the determined information indicating whether to transmit the message, in the network state response. According to an embodiment, the first bot agent 241 may determine whether to transmit a message received from the first UE 101-1, based on the network state response. For example, the network state response may include the at least one throttling metric set for the first RCS network 291 of the first bot 201 and the network state (e.g., throttling information) of the first RCS network 291.

According to various embodiments, when the network state indicates that message transmission is impossible or when it is indicated that the network state is a load state, the first bot agent 241 may attempt to retransmit the message or may determine the transmission error of the message. According to an embodiment, the first bot agent 241 may repeat operation 326 and operation 327 at a specified cycle. For example, when the network state response indicates that message transmission is possible, the first bot agent 241 may perform the operations of FIG. 3C, described below. For example, when the iteration of operations 326 and/or 327 exceeds the specified number of times, the first bot agent 241 may determine a message transmission error and may transmit an error message to the first UE 101-1.

According to an embodiment, when the first bot agent 241 performs the transmission of a message based on the network state response, the first bot agent 241 may perform the subsequent procedures of FIG. 3C. For example, when the first bot agent 241 receives the network state response indicating a message transmission or when a message transmission is determined based on the network state response, the first bot agent 241 may perform the subsequent procedure of FIG. 3C.

Referring to flowchart 300c of FIG. 3C, according to various embodiments, in operation 330, the first bot agent 241 may transmit a message received from the first UE 101-1, to the bot service 217. According to an embodiment, the first bot agent 241 may convert a message based on SIP or MSRP into a message based on HTTP or HTTPS, and then may transmit the converted message to the bot service 217.

According to various embodiments, in operation 335, the bot service 217 may transmit a DNS query to the DNS 390. For example, the bot service 217 may query the DNS 390 for an address (e.g., a callback URL) corresponding to the bot ID included in the message received from the first bot agent 241.

According to various embodiments, in operation 340, the bot service 217 may receive a DNS response including the identifier (e.g., callback URL) of the bot 201, from the DNS 390.

According to various embodiments, in operation 345, the bot service 217 may transmit a message to the bot 201, using the identifier of the bot 201 included in the DNS response. For example, the bot service 217 may transmit a message to the bot 201 based on HTTP or HTTPS.

According to various embodiments, the information (e.g., a bot identifier) of the bot 201 may be stored in the bot registry 211. According to an embodiment, the bot service 217 may retrieve information about the identifier (e.g., callback URL) of the bot 201 from the bot registry 211. For example, when the identifier of the bot 201 is capable of being retrieved from the bot registry 211, operation 335 and operation 340 may be skipped.

Figure 4:
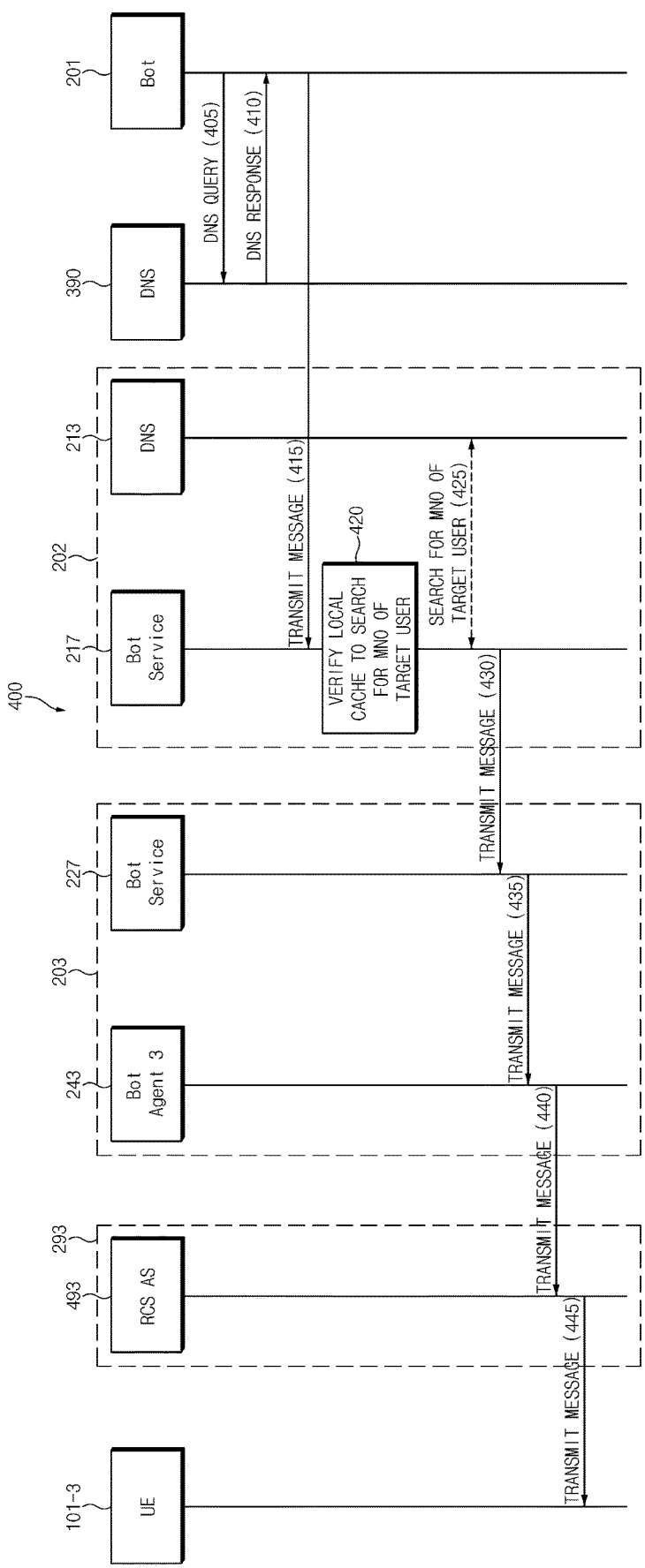
FIG. 4 is a flowchart illustrating an example message transmitting method of a bot device, according to various embodiments of the present disclosure.

FIG. 4 is a flowchart 400 illustrating an example message transmitting method of a bot device, according to various embodiments of the present disclosure.

According to an embodiment, the bot 201 may transmit a message to at least part of the member or subscriber of the chatbot service associated with the bot 201. For example, the bot 201 may transmit a message as a response to a message from a specific UE (e.g., the electronic device 101 of FIG. 1) or as the multicast or broadcast to pieces of UE. According to an embodiment, the bot 201 may be located in an area (e.g., a first area) the same as the first platform server 202 and may transmit a message to the third UE 101-3 located in an area (e.g., a second area) different from the first area. For example, the third UE 101-3 may be associated with the third RCS network 293 and may receive conversational contents through message transmission between the first platform server 202 and the second platform server 203.

According to various embodiments, in operation 405, the bot 201 may transmit a DNS query to the DNS 390. In operation 410, the bot 201 may find the end point of the platform server at the location corresponding to the bot 201 by receiving a DNS response from the DNS 390. According to an embodiment, when the bot 201 is located in the first area, the bot 201 may find the end point of the first platform server 202 through the DNS response. According to an embodiment, the bot 201 may perform operation 415 based on the end point information of the platform server associated with the location of the bot 201. For example, when the bot 201 has the end point information of the platform server associated with the location of the bot 201, operation 405 and operation 410 may be skipped.

According to various embodiments, in operation 415, the bot 201 may transmit a message to the bot service 217 of the first platform server 202. For example, the message may include at least one of the bot ID, the chat ID to which the message belongs, the user ID, the phone number, or the message transmitted by the bot 201.

According to various embodiments, in operation 420, the bot service 217 may verify a local cache for the purpose of searching for the MNO of the target user (e.g., target UE) of the message. For example, when the message from the bot 201 is the response of the message from the third UE 101-3, the bot service 217 may store at least one of the information (e.g., MSISDN) of the third UE 101-3 or the MNO information (e.g., the MNO information of the third RCS network 293) associated with the third UE 101-3 in the local cache of the first platform server 202.

According to various embodiments, in operation 425, the bot service 217 may search for the MNO of the target user of the message, using the user registry 213. For example, when the user of the third UE 101-3 agrees to terms & services of the chatbot service by the bot 201, the user information may be stored in the user registry (e.g., the user registry 223 of FIG. 2) of the platform server (e.g., the second platform server 203) associated with the third UE 101-3. For example, user information may include at least one of the identifier (e.g., MSISDN) of the third UE 101-3 or MNO information subscribed by the third UE 101-3. According to an embodiment, user information may be shared or synchronized between platform servers located in regions different from each other. For example, the user information (e.g., information in the user database) associated with the user registry 213 of the first platform server 202 and the user information associated with the user registry 223 of the second platform server 203 may be shared or synchronized. According to an embodiment, the bot service 217 may search for the user information of the third UE 101-3, using the user registry 213.

At least one of operation 420 and operation 425 described above may be skipped. According to an embodiment, operation 425 may be performed when the user information of the target user is not found by operation 420.

According to various embodiments, in operation 430, the bot service 217 may search for the second platform server 203 associated with the MNO of the third UE 101-3 through operation 420 or operation 425 and may transmit a message to a bot service 227 of the second platform server 203 via the connection between the first platform server 202 and the second platform server 203.

According to various embodiments, in operation 435, the bot service 227 may transmit (or route) a message to the bot agent (e.g., the third bot agent 243) associated with the MNO of the third UE 101-3, which is the target user of the message.

According to various embodiments, in operation 440, the third bot agent 243 may transmit a message to the RCS AS 493 of the third RCS network. For example, the third bot agent 243 may convert the message from the bot service 227 into a message based on the protocol (e.g., SIP or MSRP) of the third RCS network 293 and may transmit the converted message to the RCS AS 493.

According to various embodiments, in operation 445, the RCS AS 493 may transmit a message to the third UE 101-3, using the user information (e.g., MSISDN) included in the message.

Figure 5:
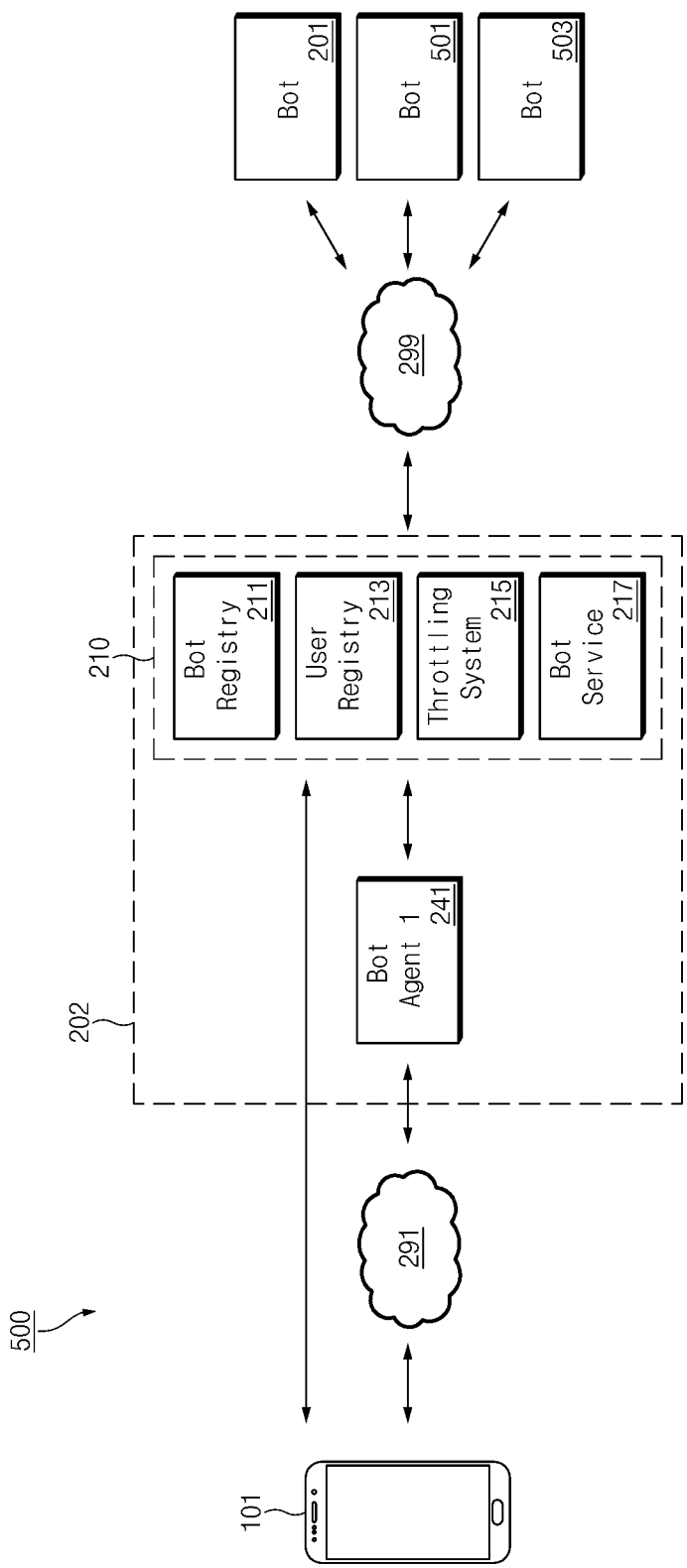
FIG. 5 is a diagram illustrating an example bot information transmitting method, according to various embodiments.

FIG. 5 is a diagram illustrating an example bot information transmitting method, according to various embodiments.

Referring to a conversational contents providing system 500 of FIG. 5, according to various embodiments, a platform server may be associated with a plurality of bots. According to an example embodiment, a plurality of bots (e.g., the first bot 201, a second bot 501, and a third bot 503) may be associated with the first platform server 202. For example, the bot registry 211 may manage information about a plurality of bots (e.g., the first bot 201, the second bot 501, and the third bot 503).

As described above with reference to operation 315 and operation 320 of FIG. 3A, according to an embodiment, the electronic device 101 may perform a bot search, using the bot registry 211. For example, the bot registry 211 may receive a bot search request from the electronic device 101 and may transmit the search result corresponding to the received bot search request to the electronic device 101. For example, the search result may include a bot list. For example, the search result may include at least one of a name of a bot, publisher information of a bot, MSISDN of a bot, ID of a bot, URL information of an icon of a bot, bot network state information (e.g., throttling information), bot simple information, or bot detailed information.

According to an embodiment, when the bot search request is received from the electronic device 101, the bot registry 211 may search for a bot corresponding to a search condition (e.g., a search word) and may retrieve throttling information of the found bot from the throttling system 215. According to an embodiment, the bot registry 211 may transmit the throttling information of the found bot to the electronic device 101.

According to an embodiment, when the bot query request is received from the electronic device 101, the bot registry 211 may retrieve the throttling information corresponding to the bot receiving the query request, from the throttling system 215. According to an embodiment, the bot registry 211 may transmit the throttling information of the requested bot to the electronic device 101.

According to an embodiment, the throttling system 215 may manage the throttling information for each of the bots 201, 501, and 503 associated with the first platform server 202 measured during a specified time period. Hereinafter, returning to FIG. 2, operations of the throttling system 215 will be described in greater detail below.

Returning to FIG. 2, according to an embodiment, different throttling mechanisms or different throttling profiles may be set for the plurality of RCS networks associated with the same platform server. For example, with regard to the first RCS network 291 and the second RCS network 292, the throttling system 215 may perform throttling control based on different profiles or different algorithms.

According to an embodiment, the RCS networks 291, 292, and 293 may include a presence server that manages capability information of the subscribed UE. For example, the capability information of the UE may include information indicating a state (e.g., whether a phone service is started, whether a phone service is subscribed, busy, a video/voice call, activation, deactivation, and/or whether a phone service is terminated) of the UE. According to an embodiment, the RCS networks 291, 292, and 293 may retrieve the capability information based on different protocols. For example, the first RCS network 291 may verify the capability of the UE (e.g., the electronic device 101 of FIG. 1) based on extensible messaging and presence protocol (XMPP). For example, the second RCS network 292 may verify the capability of the UE 101, using SIP-based options messages (e.g., SIP OPTIONS). Because different message formats and/or different SIP signaling procedures are used for the same function, different throttling controls may be performed on each RCS network.

According to an embodiment, the maximum concurrent open sessions of the first RCS network 291 may, for example, and without limitation, be 10,000, and the maximum concurrent open sessions of the second RCS network 292 may, for example, and without limitation, be 100,000. In this case, resources capable of being allowed by the first RCS network 291 and the second RCS network 292 for the bot 201 may be different from each other. Accordingly, different throttling controls may be applied depending on the profile of the RCS network with which the UE 101 is associated. For example, the profile of the RCS network may include at least one throttling metric for controlling throttling associated with the RCS network. For example, the profile of a RCS network may include, for example, and without limitation, at least one of maximum concurrent open sessions, maximum bot information query rate, maximum equipment presence query rate, maximum message rate, maximum message data bandwidth, maximum group chats, maximum group chat members, maximum broadcast recipients, maximum file transmission rate, or the like, which is set for the RCS network.

According to various embodiments, the throttling system 215 may manage different profiles (e.g., throttling profiles) depending on the MNO. According to an embodiment, the throttling system 215 may allow different messages per time (e.g., message/sec) and/or different concurrent open sessions, depending on the MNO or RCS network.

Returning to FIG. 5, according to an embodiment, different throttling mechanisms or different throttling profiles may be set for the plurality of bots 201, 501, and 503 associated with the same platform server. For example, with regard to the same first RCS network 291, the throttling system 215 may perform throttling control based on different profiles or different algorithms, on the bot 201, the bot 501, and the bot 503.

According to an embodiment, the throttling system 215 may perform throttling control on each of the bots 201, 501, and 503, using profiles set differently depending on a MNO, an RCS network, or a bot agent. For example, with regard to the bot 201, the first profile may be set to the first MNO; the second profile may be set to the second MNO; and the third profile may be set to the third MNO. For example, with regard to the bot 501, the fourth profile may be set to the first MNO; and the fifth profile may be set to the second MNO. For example, each profile may include at least one throttling metric.

According to various embodiments, the throttling metric that allows the throttling system 215 to manage throttling depending on each MNO, RCS network, and/or bot may include at least one of the metrics in Table 2 below.

TABLE 2

| Throttling metric | Description | Unit (example) |
| --- | --- | --- |
| Concurrent open sessions | Limitation on maximum concurrent maintenance sessions according to each operator network | Sessions |
| Bot info query rate | Limitation on the maximum number of bot information queries per unit time by using platform API | queries/sec |
| Equipment presence query rate | Limitation on the maximum number of presence message exchanges per unit time according to each operator network | queries/sec, queries/day |
| Message rate | Limitation on the maximum number of message transmissions per unit time according to each operator network | message/sec, message/day |
| Message data bandwidth | Limitation on the amount of maximum message transmission data per unit time according to each operator network | KB/sec |
| Max group chats | Limitation on group chats capable of being generated per unit time | Chats/day |
| Max group chat members | Limitation on the maximum number of members capable of being included in group chat | Members/chat |
| Max broadcast recipients | Limitation on the number of broadcast recipients of a bot according to each operator network | Recipients/day |
| File transmission rate | Limitation on the maximum number of file transmissions per unit time according to each operator network | Files/second, files/minute, files/day |

According to an embodiment, the UE 101 may transmit a message to the bot 201. For example, the first bot agent 241 may receive a message through the first RCS network 291. According to an embodiment, the first bot agent 241 may query the throttling system 215 about whether to transmit a message. The throttling system 215 may determine whether to transmit a message, based on a profile (e.g., throttling metric) of the first RCS network 291 of the bot 201 associated with the message. For example, when the number of sessions of the first RCS network 291 set for the bot 201 reaches a specified value (e.g., maximum concurrent open sessions), the throttling system 215 may transmit an error message to the first bot agent 241. For example, the error message may include error clause information. For example, when message transmission is allowed based on the profile of the first RCS network 291 of the bot 201, the throttling system 215 may transmit a message indicating the message transmission, to the first bot agent 241.

According to an embodiment, the bot 201 may transmit the message to pieces of UE including the UE 101. For example, the bot service 217 may receive the message from the bot 201 through the data network 299. According to an embodiment, the bot service 217 may query about whether to transmit a message to the throttling system 215. The throttling system 215 may determine whether to transmit a message, based on a profile (e.g., throttling metric) of the first RCS network 291 of the bot 201 associated with the message. For example, when the sum of the number of current sessions of the first RCS network 291 and the number of sessions to be generated by the message exceeds maximum concurrent open sessions set for the first RCS network 291, the throttling system 215 may determine a transmission error for at least part of a message. For example, when the number of recipients associated with the first RCS network 291 among the recipients of the message exceeds the number of maximum broadcast recipients of the first RCS network 291 set for the bot 201, the throttling system 215 may determine the transmission error for at least part of the message. For example, when the message rate to be applied to the first RCS network 291 due to the requested message exceeds the maximum message rate set for the first RCS network 291, the throttling system 215 may determine the transmission error for at least part of a message. For example, when a message data bandwidth of the first RCS network 291 including the bandwidth of the first RCS network 291 required by the requested message exceeds the maximum message data bandwidth set for the first RCS network 291, the throttling system 215 may determine the transmission error for at least part of a message. For example, when the file transmission rate of the first RCS network 291 caused by the requested message exceeds the file transmission rate set for the first RCS network 291, the throttling system 215 may determine the transmission error for at least part of a message. When the transmission error for at least part of a message is determined, the throttling system 215 may transmit an error message to the bot service 217 and/or the bot 201. For example, when message transmission is allowed based on the profile of the first RCS network 291 of the bot 201, the throttling system 215 may transmit a message indicating that the message transmission of the first RCS network 291, to the bot service 217.

Figure 6:
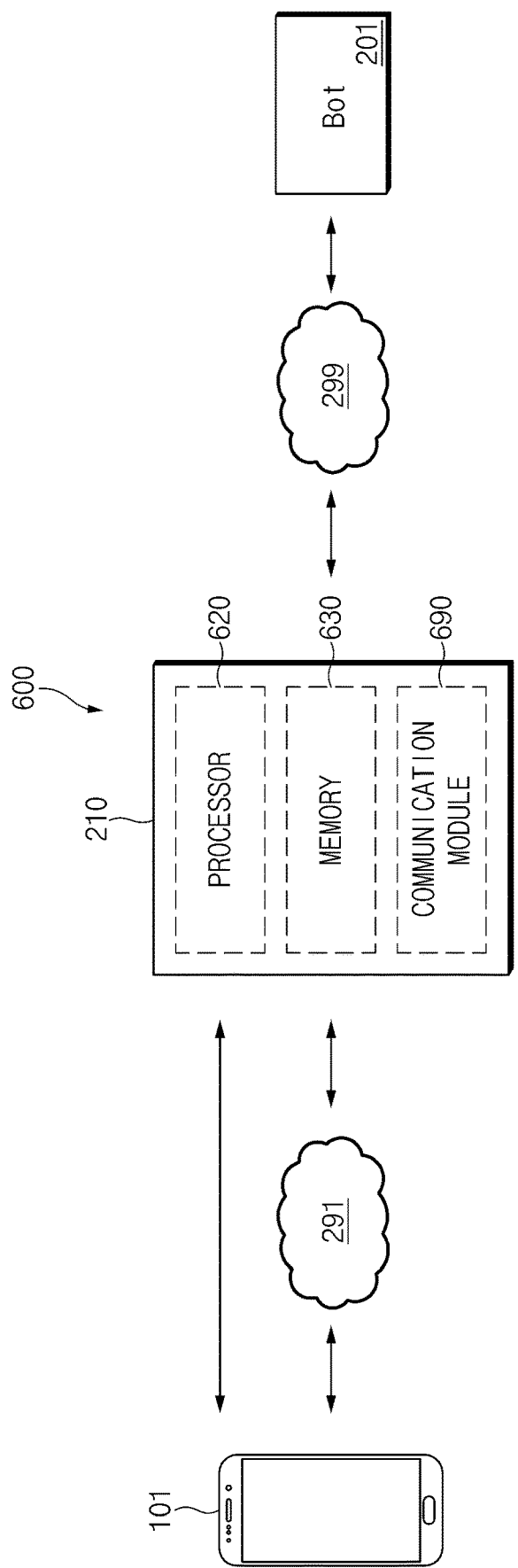
FIG. 6 is a block diagram illustrating an example platform server, according to various embodiments.

FIG. 6 is a block diagram 600 illustrating an example platform server, according to various embodiments.

According to various embodiments, the first platform server 202 may include at least one of a processor (e.g., including processing circuitry) 620, a memory 630, and/or a communication module (e.g., including communication circuitry) 690. For example, the processor 620 may be operatively connected to the memory 630 and the communication module 690 and may control the operations of the memory 630, the communication module 690, and the first platform server 202.

According to an embodiment, the memory 630 may be operatively or electrically connected to the processor 620 and may store various pieces of information. For example, the memory 630 may store a user database and a bot database. For example, the memory 630 may store instructions that may be executed by the processor 620 to perform various operations.

According to various embodiments, the communication module 690 may include various communication circuitry and provide communication between the UE (e.g., the electronic device 101 of FIG. 1) and the bot 201. For example, the communication module 690 may communicate with the UE 101 via the first RCS network 291 and/or a data network (e.g., IP network). For example, the communication module 690 may communicate with the bot 201 over the data network.

According to various embodiments, the processor 620 may generate at least one software module depending on instructions stored in the memory 630. For example, the configurations of the first platform server 202 described above with reference to FIG. 2 may be software modules generated by the processor 620.

According to various embodiments, the processor 620 may receive a message to (for) the bot 201, from the UE 101 via the first RCS network 291, which is associated with the UE 101, from among a plurality of RCS networks using the communication module 690. The processor 620 may determine whether to transmit the received message, based on the profile of the bot 201 stored in the memory 630 and the state of the first RCS network 291. When it is determined that the processor 620 may transmit a message, the processor 620 may convert the message based on the protocol of the data network 299; the processor 620 may transmit the converted message to the bot 201 via the data network 299. For example, the profile of the bot 201 may include at least one throttling metric of the first RCS network 291 among a plurality of RCS networks. According to an embodiment, the processor 620 may transmit an error message to the UE 101 via the first RCS network 291 based on the determination that the processor 620 does not transmits the message.

For example, a plurality of RCS networks may be associated with network operators different from one another. According to an embodiment, a plurality of RCS networks may include the first RCS network 291 and a second RCS network (not illustrated). For example, the profile of the bot 201 may include at least one first throttling metric set for the first RCS network 291 and at least one second throttling metric set for the second RCS network. For example, the first throttling metric and the second throttling metric may be different from each other.

For example, at least one first throttling metric may include, for example, and without limitation, at least one of maximum concurrent open sessions, bot information query rate, presence query rate, message rate, message data bandwidth, maximum group chats, maximum group chat members, maximum broadcast recipients, maximum file transmission rate, or the like, with regard to the first RCS network 291.

According to an embodiment, the memory 630 may store a unique identifier for the bot 201, a first identifier of the bot 201 for the first RCS network 291 associated with the unique identifier, and a second identifier for the bot 201 for the second RCS network associated with the unique identifier.

According to an embodiment, the processor 620 may verify the unique identifier of the bot 201 associated with the first identifier included in the message received from the UE 101 and may transmit the converted message to the bot 201 by using the unique identifier.

According to an embodiment, each of the first identifier and the second identifier of the bot 201 may include at least one of MSISDN or SIP URI.

According to various embodiments, the processor 620 may receive a message to (for) the UE 101, from the bot 201 over a data network using the communication module 690, may verify the first RCS network 291 associated with the UE 101 among a plurality of RCS networks based on user information stored in the memory 630, may convert the message based on the protocol of the first RCS network 291, and may transmit the converted message to the UE 101 over the first RCS network 291.

For example, a plurality of RCS networks may each be associated with network operators different from one another.

According to an embodiment, the memory 630 may include a bot database including information about at least one bot (e.g., the bot 201). For example, the memory 630 may store the identifier of each of a plurality of RCS networks for a unique identifier of the bot 201. For example, the identifier of each of a plurality of RCS networks may include at least one of MSISDN or SIP URI.

According to an embodiment, the memory 630 may include a user database including user information associated with at least one bot. For example, the user database may include, for example, and without limitation, at least one of user identification information (e.g., MSISDN), RCS network information associated with a user, network operator information associated with the user, location information associated with the user, bot information subscribed by the user, or the like.

According to an embodiment, the memory 630 may include the configurations of the first platform server 202 of FIG. 2. For example, the memory 630 may include, for example, and without limitation, at least one of the first bot agent 241, the second bot agent 242, the bot registry 211, the user registry 213, the throttling system 215, the bot service 217, or the like.

According to an embodiment, the processor 620 may determine whether to transmit a message, based on the state of the first RCS network 291 and the profile set for the bot 201. For example, the profile may include at least one throttling metric of the first RCS network 291.

According to various embodiments, the memory 630 may store instructions that, when executed by the processor 620 control an electronic device to receive a message for a second external electronic device (e.g., the bot 201), from a first external electronic device (e.g., the UE 101) through a first network (e.g., the first RCS network 291) associated with the first external electronic device among a plurality of rich communication suite (RCS) networks (e.g., RCS network 291, 292, and 293 of FIG. 2) using the communication circuit (e.g., the communication module 690), to determine whether to transmit the message based on a profile of the second external electronic device 201 including at least one throttling metric for the first network 291 among the plurality of RCS networks 291, 292, and 293 stored in the memory 630 and a network state of the first network, and, when it is determined that the message is transmitted, to convert the message based on a protocol of a second network (e.g., the data network 299) and to transmit the converted message to the second external electronic device 201 through the second network 299.

According to an embodiment, the instructions stored in the memory 630 may, when executed by the processor 620, cause the processor 620 to control an electronic device to transmit an error message to the first external electronic device 101 through the first network 291, based on determination that the message is not transmitted.

For example, the plurality of RCS networks 291, 292, and 293 may be associated with network operators different from each other.

For example, a plurality of RCS networks 291, 292, 293 may at least include the first network 291 and third network 292 (e.g., the second RCS network), and the profile may include at least one first throttling metric set for the first network 291 and at least one second throttling metric set for the third network 292. For example, the at least one first throttling metric and the at least one second throttling metric may be different from each other.

For example, the at least one first throttling metric and/or at least one second throttling metric may include at least one of maximum concurrent open sessions, bot information query rate, presence query rate, message rate, message data bandwidth, maximum group chats, maximum group chat members, maximum broadcast recipients, or maximum file transmission rate, with regard to the first network 291 and/or the third network 292.

For example, the memory 630 may store a unique identifier of the second external electronic device 201, a first identifier of the second external electronic device 201 for the first network 291 associated with the unique identifier, and a second identifier of the second external electronic device 201 for the third network 292 associated with the unique identifier.

For example, the instructions may, when executed, cause the processor 620 to control an electronic device to verify the unique identifier of the second external electronic device 201 associated with the first identifier included in the message received from the first external electronic device 101 and to transmit the converted message to the second external electronic device 201 by using the unique identifier.

For example, each of the first identifier and the second identifier may include at least one of mobile station international subscriber directory number (MSISDN) or session initiation protocol (SIP) uniform resource indicator (URI).

According to various embodiments, the memory 630 may store instructions that, when executed by the processor 620, cause an electronic device to receive a message to a second external electronic device 201, from a first external electronic device 101 through a second network 299 using the communication circuit 690, to verify a first network 291 associated with the first external electronic device 101 among a plurality of RCS networks 291, 292, and 293 based on user information stored in the memory 630, to convert the message based on a protocol of the first network 291 and to transmit the converted message to the first external electronic device 101 through the first network 291.

For example, the memory 630 may store instructions that, when executed by the processor 620 control an electronic device to determine whether to transmit the message, based on a state of the first network 291 and a profile, which is set for the second external electronic device 201 and which includes at least one throttling metric for the first network 291.

According to an embodiment, the message to the first external electronic device 101, which is received from the second external electronic device 201, is routed to the electronic device 600 by the third external electronic device (e.g., a platform server placed in a region (e.g., different countries) different from the electronic device 600). For example, the electronic device 600 and the first external electronic device 101 are located in the same location (e.g., country) as each other.

According to various embodiments, the memory 630 may include a bot registry module (e.g., the chat registry 211 of FIG. 2) managing chatbot information of at least one chatbot (e.g., the bot 201), a user registry module (e.g., the user registry 213 of FIG. 2) managing user information, a throttling system module (e.g., the throttling system 215 of FIG. 2) controlling throttling associated with the at least one chatbot, a bot service module (e.g., the bot service 217 of FIG. 2) controlling a message between the at least one chatbot and the electronic device 600, and a plurality of bot agent modules (e.g., the first bot agent 241 and the second bot agent 242 of FIG. 2) converting a message generated based on a first protocol depending on a second protocol or converting a message generated depending on the second protocol depending on the first protocol and controlling message transmission and reception between the electronic device 600 and user equipment 101. For example, a plurality of bot agent modules 241 and 242 may include a first bot agent module 241 and a second bot agent module 242, and a first network (e.g., the first RCS network 291 of FIG. 2) associated with the first bot agent module 241 and a second network (e.g., the second RCS network 292 of FIG. 2) associated with the second bot agent module 242 are associated with network operators different from each other.

For example, the throttling system module 215 may be configured to control traffic of a first chatbot 201 based on a profile set for the first chatbot 201 among the at least one chatbot, and the profile may include at least one throttling metric set for each of the first network 291 and the second network 292.

Figure 7:
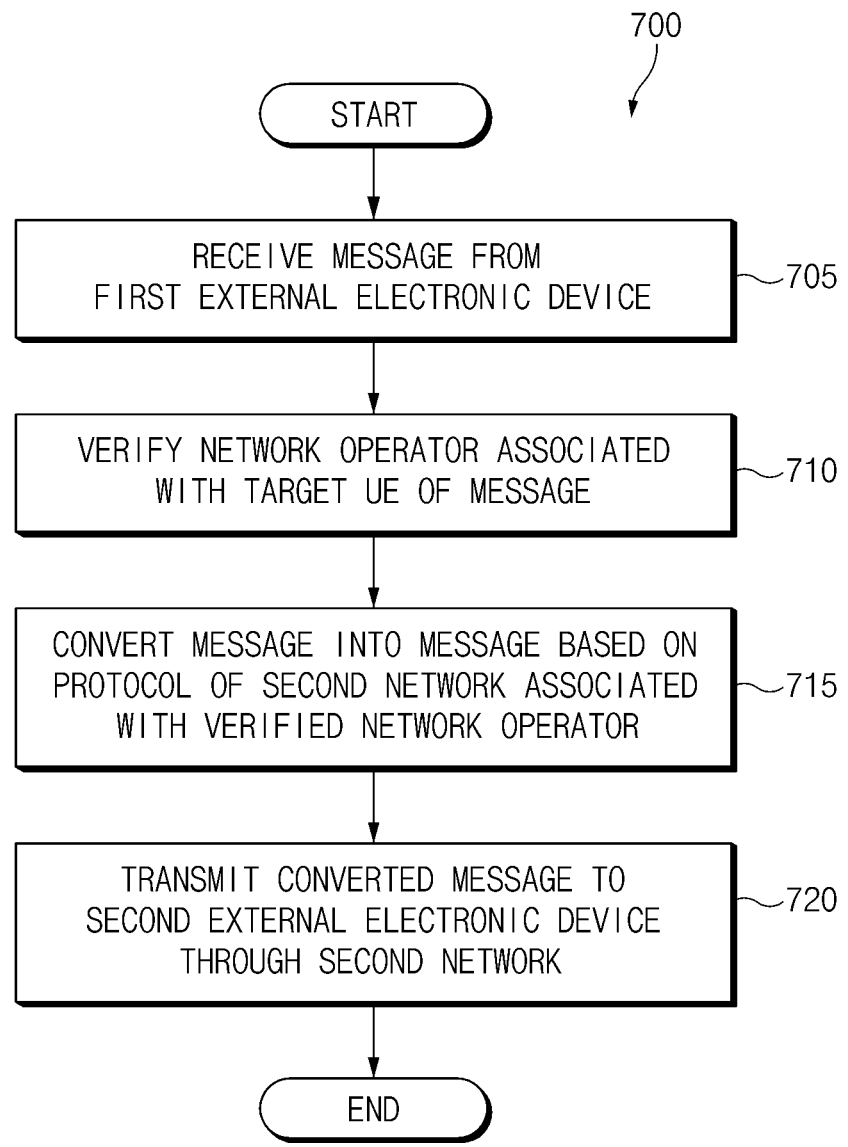
FIG. 7 is a flowchart illustrating an example message transmitting method to a target user, according to various embodiments.

FIG. 7 is a flowchart 700 illustrating an example message transmitting method to a target user, according to various embodiments.

According to various embodiments, in operation 705, the processor 620 of an electronic device (e.g., the first platform server 202 of FIG. 6) may receive a message from a first external electronic device (e.g., the bot 201 of FIG. 5) using the communication module 690. For example, the message may be a message that is based on the protocol (e.g., HTTP or HTTPS) of a first network (e.g., IP network 299). According to an embodiment, the processor 620 may receive a message from the first external electronic device 201 over the first network 299, using the communication module 690.

According to various embodiments, in operation 710, the processor 620 may verify the network operator associated with the second external electronic device (e.g., the UE 101), which is the target UE of the message. For example, as described above with reference to operation 420 and operation 425 of FIG. 4, the processor 620 may verify the network operator associated with the second external electronic device 101 from a local cache or a user database.

According to an embodiment, the processor 620 may verify the profile (e.g., throttling metric) associated with the verified network operator and may determine whether to transmit a message, based on the profile. For example, when it is determined to transmit the message, the processor 620 may perform operation 715 described in greater detail below. For example, when it is determined not to transmit the message, the processor 620 may transmit an error message to the first external electronic device 201 through the communication module 690.

According to various embodiments, in operation 715, the processor 620 may convert the message into a message that is based on the protocol (e.g., SIP or MSRP) of a second network (e.g., the first RCS network 291) associated with the verified network operator.

According to various embodiments, in operation 720, the processor 620 may transmit the converted message to the second external electronic device 101 through a second network 291 using the communication module 690.

Figure 8:
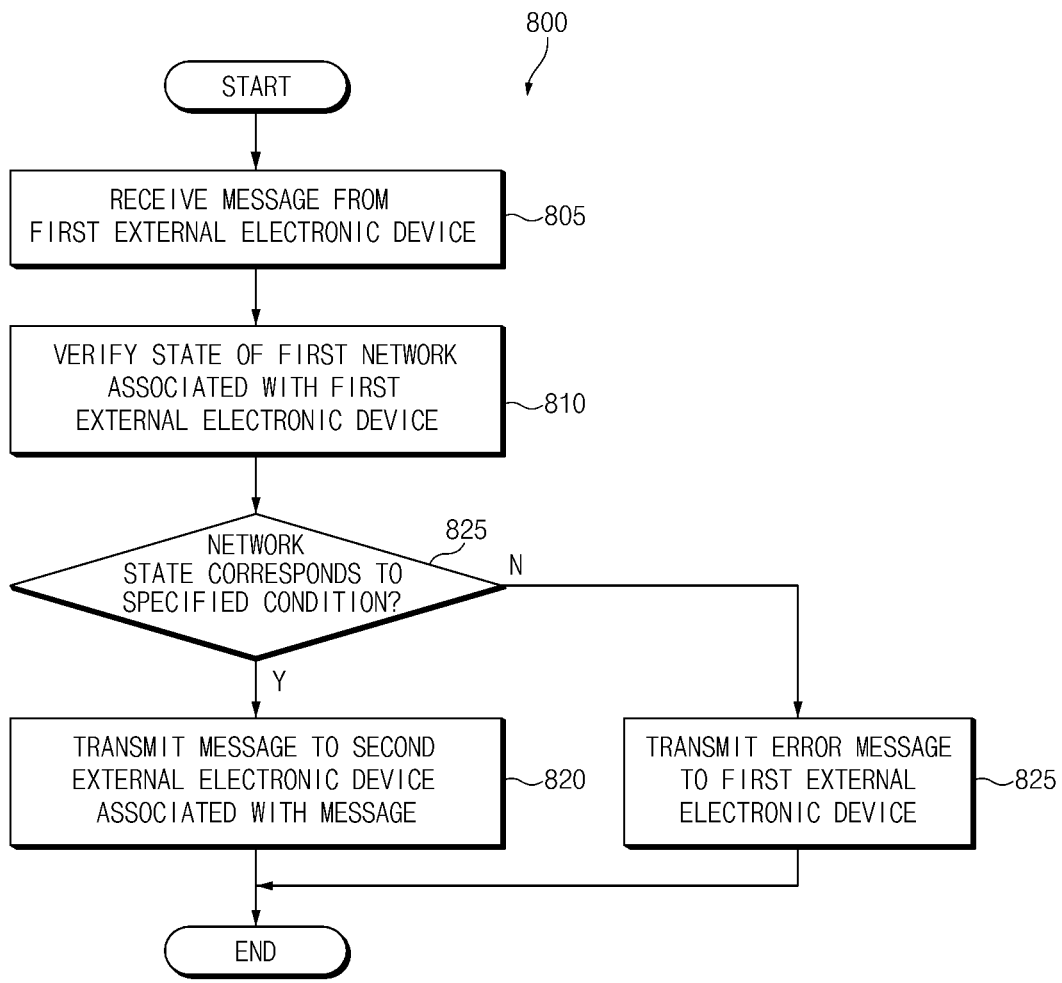
FIG. 8 is a flowchart illustrating an example method of transmitting a message to a target user based on a network state, according to various embodiments.

FIG. 8 is a flowchart 800 illustrating an example method for transmitting a message to a target UE based on a network state, according to various embodiments.

According to various embodiments, in operation 805, the processor 620 of an electronic device (e.g., the first platform server 202 of FIG. 6) may receive a message from a first external electronic device (e.g., the UE 101) using the communication module 690. For example, the processor 620 may receive a message from the first external electronic device 101 over a first network (e.g., the first RCS network 291) associated with the first external electronic device (e.g., the UE 101). For example, the message may be a message that is based on the first protocol (e.g., SIP or MSRP) of the first network.

According to various embodiments, in operation 810, the processor 620 may verify the network state of the first network 291 associated with the first external electronic device 101. For example, the processor 620 may verify information associated with concurrent open sessions of the first network 291 or throttling of the first network 291.

According to various embodiments, in operation 815, the processor 620 may determine whether the network state of the first network 291 corresponds to a specified condition. For example, the specified condition may include at least one of the above-described throttling metrics given with reference to Table 2. For example, the specified condition may be referred to as a network state satisfying the throttling metric (e.g., maximum concurrent open sessions) set for the first network 291.

According to various embodiments, in operation 820, when the network state corresponds to a specified state, the processor 620 may transmit a message to the second external electronic device (e.g., the bot 201) associated with the message. According to an embodiment, the processor 620 may transmit the message to the second external electronic device 201 over a second network (e.g., the IP network 299). According to an embodiment, the processor 620 may convert a message depending on the protocol (e.g., HTTP and/or HTTPS) of the second network and may transmit the converted message over the second network 299.

According to various embodiments, in operation 825, when the network state does not correspond to a specified state, the processor 620 may transmit an error message to the first external electronic device 101 by using the communication module 690. According to an embodiment, the processor 620 may transmit the error message to the first external electronic device 101 over the first network 291.

According to an embodiment, when the network state does not correspond to a specified state, the processor 620 may attempt the retransmission of a message during a specified time. For example, the processor 620 may again determine whether the network state corresponds to the specified condition after the specified time. For example, the processor 620 may attempt the retransmission of a message depending on a specified period. The processor 620 may generate a queue for retransmission of a message. According to an embodiment, when the transmission and/or retransmission of the message fails more than the specified number of times or when the transmission and retransmission of a message fails within a specified transmission time section, the processor 620 may perform operation 825. For example, the processor 620 may use a counter indicating that the transmission of a message fails or a timer set based on a transmission time section. For example, when the counter exceeds the specified number or when the timer has elapsed, the processor 620 may perform operation 825.

Figure 9:
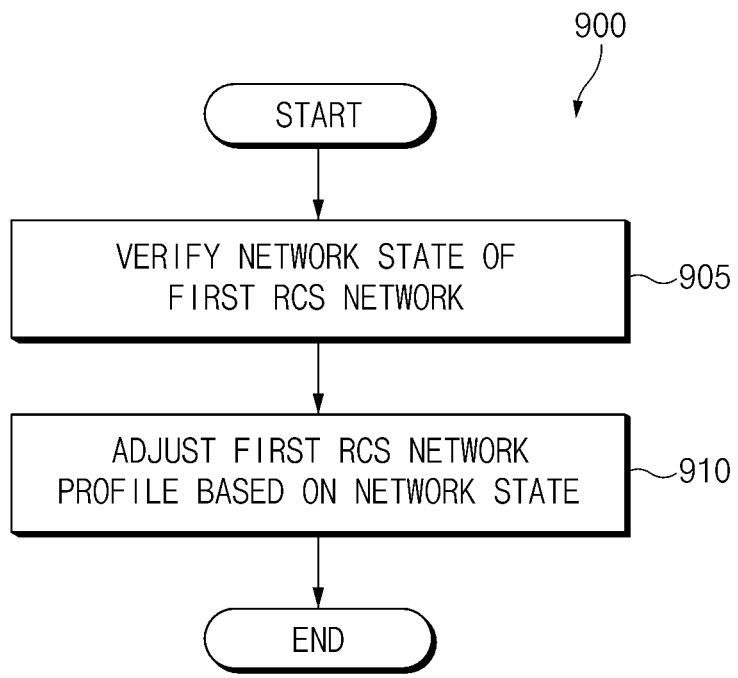
FIG. 9 is a flowchart illustrating an example method of adjusting an RCS network profile, according to various embodiments.

FIG. 9 is a flowchart 900 illustrating an example method of adjusting an RCS network profile, according to various embodiments.

According to various embodiments, in operation 905, the processor 620 of an electronic device (e.g., the first platform server 202 of FIG. 6) may verify the network state of the first RCS network 291. According to an embodiment, the processor 620 may verify the network state based on a request. For example, the request may include the reception of a message from the first external electronic device (e.g., the UE 101) or the second external electronic device (e.g., the bot 201). According to an embodiment, the processor 620 may verify the network state of the first RCS network 291 at a specified period. For example, the network state may include information associated with the throttling of a network. For example, the network state may include at least one of concurrent open sessions, bot information query rate, equipment presence query rate, message rate, group chats, or file transmission rate of the first RCS network 291.

According to various embodiments, in operation 910, the processor 620 may adjust the first RCS network profile of the second external electronic device 201, based at least on the network state of the first RCS network 291. For example, the first RCS network profile may include at least one of above-described throttling metrics given with reference to Table 2. For example, the adjustment of a profile may include the adjustment of the at least one of above-described throttling metrics.

According to an embodiment, the processor 620 may adjust the first RCS network profile of the second external electronic device 201, based at least on the network state of the first RCS network 291 during a specified period. For example, the processor 620 may adjust the first RCS network profile of the second external electronic device 201, based on a statistical value (e.g., a mean value) of the network state of the first RCS network 291 measured during the specified period.

According to an embodiment, when a plurality of bots are associated with the electronic device 202, the processor 620 may adjust the first RCS network profile of the second external electronic device 201, based at least on the network state of any other bot. For example, with regard to the first RCS network 291, maximum concurrent open sessions of the second external electronic device 201 may be set to be the same as maximum concurrent open sessions of another bot. For example, the concurrent open sessions for the first RCS network 291 of the second external electronic device 201 may be greater than the concurrent open sessions for the first RCS network 291 of another bot. In this case, the processor 620 may increase the concurrent open sessions for the first RCS network 291 of the second external electronic device 201 and may decrease the concurrent open sessions for the first RCS network 291 of another bot.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:

1. An electronic device comprising:
a communication circuit;
a processor operatively connected to the communication circuit; and
a memory operatively connected to the processor, wherein the memory stores instructions that, when executed by the processor, control the electronic device to:
receive a message for a mobile device from a chatbot device through a first network associated with the chatbot device among a plurality of rich communication suite (RCS) networks using the communication circuit, each of the plurality RCS networks being associated with different network operators;
determine whether to transmit the message based on a profile of the mobile device, the profile including at least one throttling metric for the first network among the plurality of RCS networks stored in the memory and a network state of the first network; and
convert the message based on a protocol of a second network and transmit the converted message to the mobile device through the second network based on determining to transmit the message.

2. The electronic device of claim 1, wherein the instructions, when executed by the processor, control the electronic device to:
transmit an error message to the chatbot device through the first network based on determining to not transmit the message.

3. The electronic device of claim 1, wherein the plurality of RCS networks includes at least the first network and a third network,
wherein the profile includes at least one first throttling metric set for the first network and at least one second throttling metric set for the third network, and
wherein the at least one first throttling metric and the at least one second throttling metric are different from each other.

4. The electronic device of claim 3, wherein the at least one first throttling metric includes at least one of: maximum concurrent open sessions, bot information query rate, presence query rate, message rate, message data bandwidth, maximum group chats, maximum group chat members, maximum broadcast recipients, and maximum file transmission rate, with regard to the first network.

5. The electronic device of claim 3, wherein the memory is configured to store a unique identifier of the mobile device, a first identifier of the mobile device for the first network associated with the unique identifier, and a second identifier of the mobile device for the third network associated with the unique identifier.

6. The electronic device of claim 5, wherein the instructions, when executed by the processor, control the electronic device to:
verify the unique identifier of the mobile device associated with the first identifier included in the message received from the chatbot device; and
transmit the converted message to the mobile device using the unique identifier.

7. The electronic device of claim 5, wherein each of the first identifier and the second identifier includes at least one of: a mobile station international subscriber directory number (MSISDN) and a session initiation protocol (SIP) uniform resource indicator (URI).

8. An electronic device comprising:
a communication circuit;
a processor operatively connected to the communication circuit; and
a memory operatively connected to the processor, wherein the memory stores instructions that, when executed by the processor, cause the electronic device to:
receive a message for a mobile device from a chatbot device through a first network using the communication circuit;
verify a second network associated with the mobile device among a plurality of RCS networks based on user information of the mobile device stored in the memory, each of the plurality RCS networks being associated with different network operators;
convert the message based on a protocol of the second network; and
transmit the converted message to the mobile device through the second network.

9. The electronic device of claim 8, wherein the memory is configured to store an identifier of each of the plurality of RCS networks for a unique identifier of the chatbot device.

10. The electronic device of claim 9, wherein the identifier of each of the plurality of RCS networks includes at least one of: an MSISDN and an SIP URI.

11. The electronic device of claim 8, wherein the instructions, when executed by the processor, control the electronic device to:
determine whether to transmit the message based on a state of the second network and a profile, the profile being set for the mobile device and including at least one throttling metric for the second network.

12. The electronic device of claim 11, wherein the at least one throttling metric includes at least one of: maximum concurrent open sessions, bot information query rate, presence query rate, message rate, message data bandwidth, maximum group chats, maximum group chat members, maximum broadcast recipients, and maximum file transmission rate, with regard to the second network.

13. The electronic device of claim 12, wherein the message for the mobile device received from the chatbot device, is configured to be routed to the electronic device by the chatbot device,
wherein the chatbot device and the mobile device are located in different countries, and
wherein the electronic device and the mobile device are located in the same country.

14. An electronic device comprising:
a communication circuit;
a processor operatively connected to the communication circuit; and
a memory operatively connected to the processor, wherein the memory includes:
a bot registry module comprising program elements executable by the processor and configured to manage chatbot information of a plurality of chatbots;
a user registry module comprising program elements executable by the processor and configured to manage user information;
a throttling system module comprising program elements executable by the processor and configured to control throttling associated with the plurality of chatbots;
a bot service module comprising program elements executable by the processor and configured to control a message between the plurality of chatbots and the electronic device; and
a plurality of bot agent modules comprising program elements executable by the processor and configured to convert a message generated based on a first protocol into a message depending on a second protocol or to convert a message generated based on the second protocol into a message depending on the first protocol and configured to control message transmission and reception between the electronic device and user equipment,
wherein the plurality of bot agent modules include a first bot agent module and a second bot agent module,
wherein a first network associated with the first bot agent module and a second network associated with the second bot agent module are associated with different network operators, and
wherein the throttling system module is further configured to control traffic of a first chatbot associated with the first bot agent module based on a profile set for the first chatbot among the plurality of chatbots, the profile set for the first chatbot including at least one throttling metric set for each of the first network and the second network.

15. The electronic device of claim 14, wherein the at least one throttling metric includes at least one of: maximum concurrent open sessions, bot information query rate, presence query rate, message rate, message data bandwidth, maximum group chats, maximum group chat members, maximum broadcast recipients, and maximum file transmission rate.

16. The electronic device of claim 14, wherein the first network and the second network include RCS.

17. The electronic device of claim 14, wherein the chatbot information includes a unique identifier of the chatbot and a plurality of network identifiers associated with the unique identifier of the chatbot, and
wherein the network identifiers include a first network identifier for the first network of the chatbot and a second network identifier for the second network of the chatbot.

* * * * *